United States Patent
Gupta et al.

(10) Patent No.: US 10,308,287 B2
(45) Date of Patent: Jun. 4, 2019

(54) AIR INLET SPLASH PANEL ASSEMBLY FOR A VEHICLE

(71) Applicant: GM Global Technology Operations LLC, Detroit, MI (US)

(72) Inventors: Vishal Gupta, Troy, MI (US); Anjum Baig, Auburn Hills, MI (US); Steven R. Granke, Livonia, MI (US); Kyle A. Kuznicki, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 12 days.

(21) Appl. No.: 15/676,412

(22) Filed: Aug. 14, 2017

(65) Prior Publication Data

US 2019/0047631 A1  Feb. 14, 2019

(51) Int. Cl.
*B60J 7/00* (2006.01)
*B62D 25/08* (2006.01)
*B62D 21/15* (2006.01)

(52) U.S. Cl.
CPC .......... *B62D 25/085* (2013.01); *B62D 21/152* (2013.01)

(58) Field of Classification Search
CPC ........... F02M 35/168; F02M 35/10013; F02M 35/10262; F02M 35/161; Y02T 10/146; Y02T 50/675; F23R 3/002; F23R 3/06; B33Y 10/00; B22F 3/1055
USPC .................................................... 296/187.09
See application file for complete search history.

(56) References Cited

U.S. PATENT DOCUMENTS

| | | | | |
|---|---|---|---|---|
| 2,511,549 A * | 6/1950 | Simi | ........... | F01P 5/04 123/41.49 |
| 3,202,076 A * | 8/1965 | Fieni | ........... | B60H 1/248 454/163 |
| 3,933,136 A * | 1/1976 | Burst | ........... | B60K 11/08 123/41.58 |
| 6,070,933 A * | 6/2000 | Tsukidate | ........... | B62D 35/005 296/180.1 |
| 7,234,555 B2 * | 6/2007 | Khouw | ........... | B60K 13/02 180/68.3 |
| 7,237,635 B2 * | 7/2007 | Khouw | ........... | B60K 13/02 180/68.3 |
| 8,127,878 B2 * | 3/2012 | Teraguchi | ........... | B60K 11/08 180/68.1 |
| 8,201,651 B2 * | 6/2012 | Salvesen | ........... | B60K 13/02 180/68.3 |
| 8,439,143 B2 * | 5/2013 | Leanza | ........... | B60K 13/02 123/198 E |
| 8,474,558 B2 * | 7/2013 | Ohira | ........... | F02M 35/161 180/68.3 |
| 8,892,314 B2 * | 11/2014 | Charnesky | ........... | B60K 11/085 180/68.1 |
| 8,998,293 B2 * | 4/2015 | Glickman | ........... | B60K 11/08 296/180.5 |
| 9,731,592 B2 * | 8/2017 | Kunimasa | ........... | B60K 11/04 |
| 10,119,502 B2 * | 11/2018 | Madeira | ........... | F02M 35/164 |
| 2003/0042055 A1 * | 3/2003 | Suwa | ........... | B60K 11/08 180/68.3 |

(Continued)

*Primary Examiner* — Kiran B Patel
(74) *Attorney, Agent, or Firm* — Cantor Colburn LLP

(57) ABSTRACT

An air inlet splash panel assembly for a vehicle includes a composite wall and a homogenous wall. The composite wall includes inner and outer layers. The homogeneous wall is attached to the composite wall, and the homogeneous wall and the inner layer define a chamber for the flow of air.

13 Claims, 3 Drawing Sheets

(56) References Cited

U.S. PATENT DOCUMENTS

| | | | |
|---|---|---|---|
| 2003/0160472 A1* | 8/2003 | Xia | B60K 13/02 |
| | | | 296/65.09 |
| 2003/0221905 A1* | 12/2003 | Xia | B60K 11/04 |
| | | | 181/224 |
| 2005/0274347 A1* | 12/2005 | Cusumano | F02M 35/022 |
| | | | 123/184.21 |
| 2014/0117720 A1* | 5/2014 | Matsuoka | B62D 25/081 |
| | | | 296/193.09 |
| 2014/0174091 A1* | 6/2014 | Ivory | F23R 3/002 |
| | | | 60/752 |
| 2016/0169032 A1* | 6/2016 | Porter | F01D 21/003 |
| | | | 415/118 |

* cited by examiner

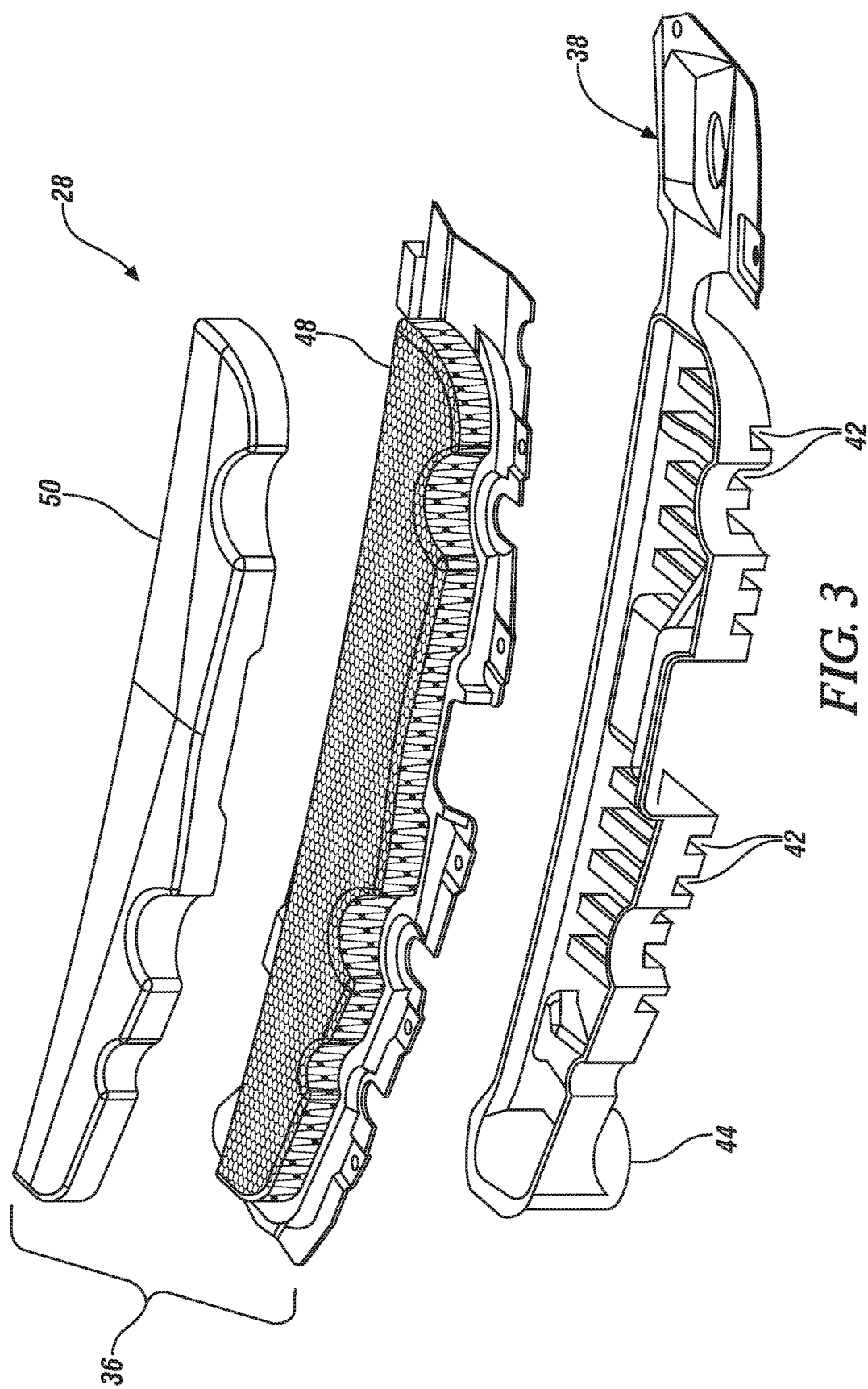

AIR INLET SPLASH PANEL ASSEMBLY FOR A VEHICLE

INTRODUCTION

The present disclosure relates to a vehicle front end assembly, and more particularly, to an air Inlet Splash Panel (ISP) assembly of the vehicle front end assembly.

Traditional vehicle front end assemblies are designed to withstand, and/or controllably react to, various impact loads at different locations and with different incident angles of impact. How a multitude of internal components react, deflect, and/or deform in response to the impact loads may be, at least in-part, controlled by safety standards, and/or government regulations. Such regulated impact responses may generally conflict with other component design criteria desired for normal operation of the vehicle. In one example, an impact load may cause plastic deformation of a vehicle hood, that in-turn, impacts or presses against an ISP assembly. To meet government regulations, it may be desirable to allow collapse of the ISP assembly with minimal resistance. However, the ISP assembly must still maintain enough structural rigidity to perform its intended function during normal vehicle operations.

SUMMARY

An air inlet splash panel assembly for a vehicle according to one, non-limiting, embodiment of the present disclosure includes a composite wall and a homogeneous wall. The composite wall includes inner and outer layers. The homogeneous wall is attached to the composite wall, and the homogeneous wall and the inner layer define a chamber for the flow of air.

Additionally to the foregoing embodiment, one of the composite wall and the homogeneous wall defines at least one air inlet in fluid communication with the chamber.

In the alternative or additionally thereto, in the foregoing embodiment, one of the composite wall and the homogeneous wall defines an air outlet in fluid communication with the chamber.

In the alternative or additionally thereto, in the foregoing embodiment, the homogeneous wall defines the at least one air inlet and the air outlet.

In the alternative or additionally thereto, in the foregoing embodiment, the composite wall is an upper cap, and the homogeneous wall is a lower tray.

In the alternative or additionally thereto, in the foregoing embodiment, the tray defines a plurality of air inlets and an air outlet both in fluid communication with the chamber.

In the alternative or additionally thereto, in the foregoing embodiment, one of the inner and outer layers is a resiliently flexible layer and the other of the inner and outer layers is a structural layer.

In the alternative or additionally thereto, in the foregoing embodiment, the inner layer is the structural layer.

In the alternative or additionally thereto, in the foregoing embodiment, the structural layer defines a plurality of perforations.

In the alternative or additionally thereto, in the foregoing embodiment, each one of the plurality of perforations is in fluid communication with the chamber.

In the alternative or additionally thereto, in the foregoing embodiment, the structural layer is honeycombed.

In the alternative or additionally thereto, in the foregoing embodiment, the structural layer includes a plurality of slots for stress relief.

In the alternative or additionally thereto, in the foregoing embodiment, the resiliently flexible layer is elastomeric and the structural layer is plastic.

A vehicle front end assembly according to another, non-limiting, embodiment includes a hood, an air intake grill, and an air inlet splash panel assembly. The hood includes a forward lip, and is constructed and arranged to undergo plastic deformation upon an impact force having a downward vector component and a rearward vector component. The air intake grill is disposed below, and is in releasable engagement with, the forward lip, and is adapted to flow air in a rearward direction. The air inlet splash panel assembly is disposed below the hood and behind the air intake grill, and includes a lower tray and an upper composite cap disposed adjacent to the hood. The lower tray and the upper composite cap define an air chamber, and the lower tray defines at least one air intake in fluid communication with the chamber and adapted to receive the air from the air intake grill. The upper composite cap is constructed and arranged to controllably deform upon impact with the hood during the plastic deformation.

Additionally to the foregoing embodiment, the upper composite cap includes a resiliently flexible layer and a structural layer attached to the resiliently flexible layer.

In the alternative or additionally thereto, in the foregoing embodiment, the structural layer includes a plurality of perforations constructed and arranged to control deformation of the structural layer during the plastic deformation of the hood via the impact force.

In the alternative or additionally thereto, in the foregoing embodiment, the resiliently flexible layer is constructed and arranged to seal the plurality of perforations preventing airflow there-through.

In the alternative or additionally thereto, in the foregoing embodiment, the lower tray defines an air outlet in fluid communication with the chamber.

In the alternative or additionally thereto, in the foregoing embodiment, the plurality of perforations are in fluid communication with the chamber.

In the alternative or additionally thereto, in the foregoing embodiment, the structural layer is constructed and arranged to exert a controlled reactive force associated with the impact force, and the resiliently flexible layer is constructed and arranged to not influence the reactive force.

The above features and advantages and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 3 is a disassembled, perspective, view of an air Inlet Splash Panel (ISP) assembly of the vehicle front end assembly.

DETAILED DESCRIPTION

Figure 1:
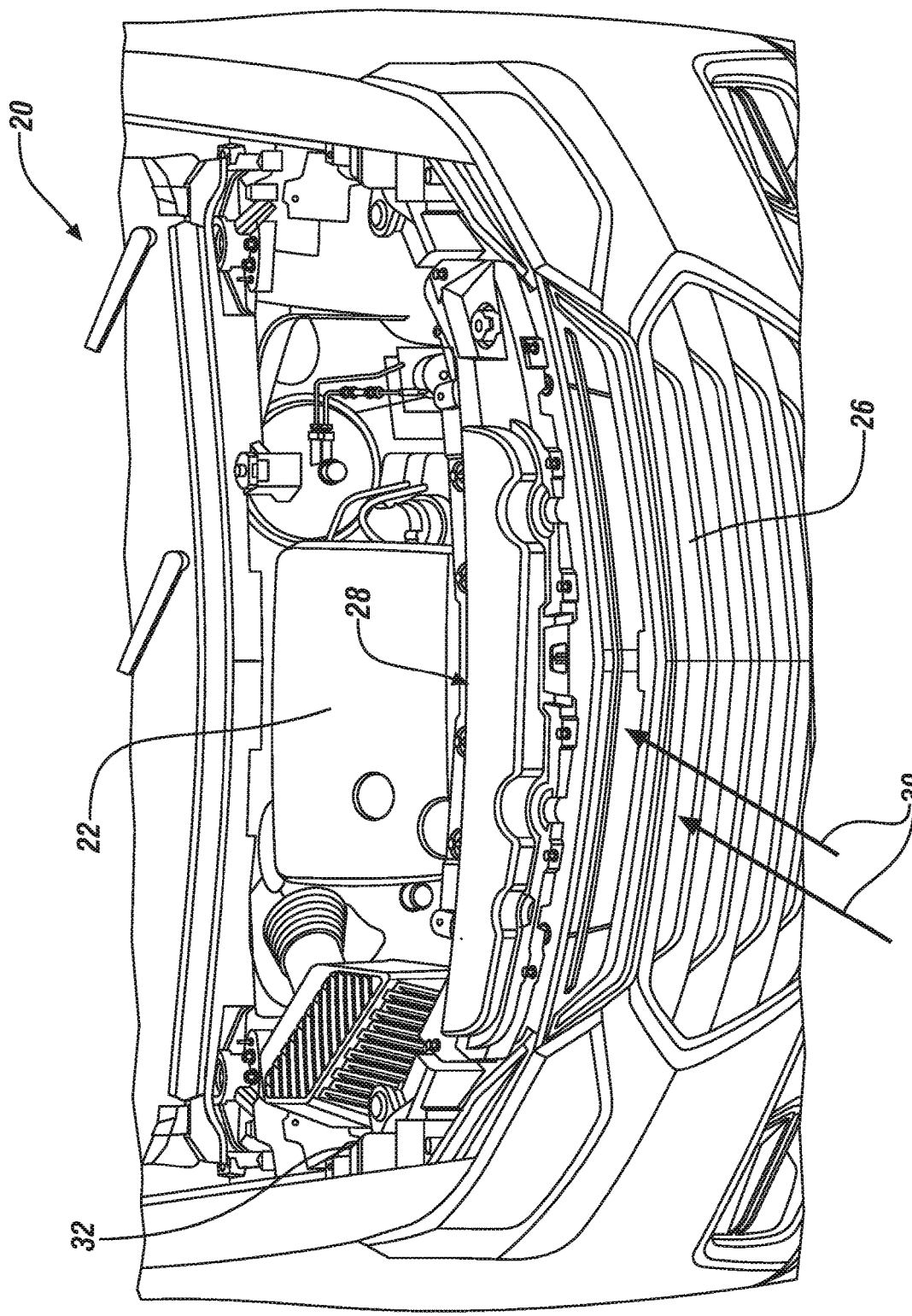
FIG. 1 is a top-down perspective view of a vehicle front end assembly as one, non-limiting, exemplary embodiment in accordance with the present disclosure.

The following description is merely exemplary in nature and is not intended to limit the present disclosure, its application or uses. It should be understood that throughout the drawings, corresponding reference numerals indicate like or corresponding parts and features.

Referring to FIG. 1, a vehicle front end assembly 20 may include a combustion engine 22, a hood 24 (see FIG. 2), an air intake grill 26, and an air Inlet Splash Panel (ISP) assembly 28. The air intake grill 26 may be a cosmetically pleasing attribute of the vehicle, and functions to direct a flow of fresh air (see arrows 30) in a rearward direction, through the grill, and generally into an engine compartment 32 located rearward from the air intake grill 26. The engine compartment 32 may be defined, in-part, by the hood 24 when closed. The hood 24 includes a forward lip 34 that may be in close proximity to, or in detachable contact with, an upper structural portion of the air intake grill 26. The engine 22 is located in the engine compartment 32. The ISP assembly 28 may also be generally located in the engine compartment 32 and forward of the engine 22. Further, the ISP assembly 28 may be located behind the air intake grill 26, immediately under the hood 24, and may be elongated, longitudinally extending substantially horizontal and along the breadth of the air intake grill 26. In operation, the ISP assembly redirects a portion of the air 30 to the engine 22 to mix with fuel for combustion.

Figure 2:
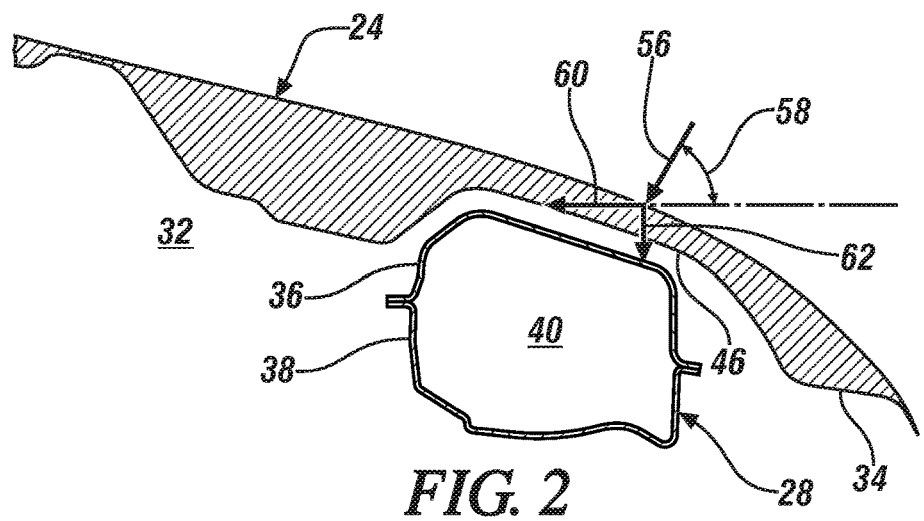
FIG. 2 is a cross section of the vehicle front end assembly.

Referring to FIGS. 2 and 3, the ISP assembly 28 may include a first wall 36 attached to a second wall 38. Together, the walls 36, 38 include a boundary that defines an air chamber 40 adapted for a sufficient mass flow of air 30 to the combustion engine 22. The first wall 36 may be a composite wall, may be located above the second wall, and may be disposed immediately adjacent to an underside 46 of the hood 24. The second wall 38 may be homogeneous and may be manufactured as one homogeneous piece. In one embodiment, the first wall 36 may be an upper cap, and the second wall 38 may be a lower tray. The second wall 38 may define a plurality of air inlets 42 distributed longitudinally along and through the second wall 38, and an air outlet 44. The inlets 42 and the outlet 44 are in direct fluid communication with the chamber 40. The material of the second wall 38 may be injection molded plastic.

The composite first wall 36 (i.e., upper cap), may include an inner layer 48 and an outer layer 50. The inner layer 48 carries a boundary that defines, in-part, the chamber 40. The outer layer 50 is formed to, or otherwise attached to, the inner layer 48, and may be directly adjacent to the underside 46 of the hood 24. In one embodiment, the inner layer 48 is a structural layer adapted to maintain the volume of the chamber 40 during normal operation, while undergoing a 'controlled' plastic deformation during a crash or impact scenario that may first cause plastic deformation of the hood 24 that then presses against the upper, composite, first wall 36 of the ISP assembly 28. With the inner layer 48 being the structural layer, the outer layer 50 may be a resiliently flexible layer. The resiliently flexible layer 50 may be elastomeric, and the structural layer 48 may be plastic. It is contemplated and understood that the outer layer 50 may be the structural layer, and the inner layer 48 may be the resiliently flexible layer.

Figure 4:
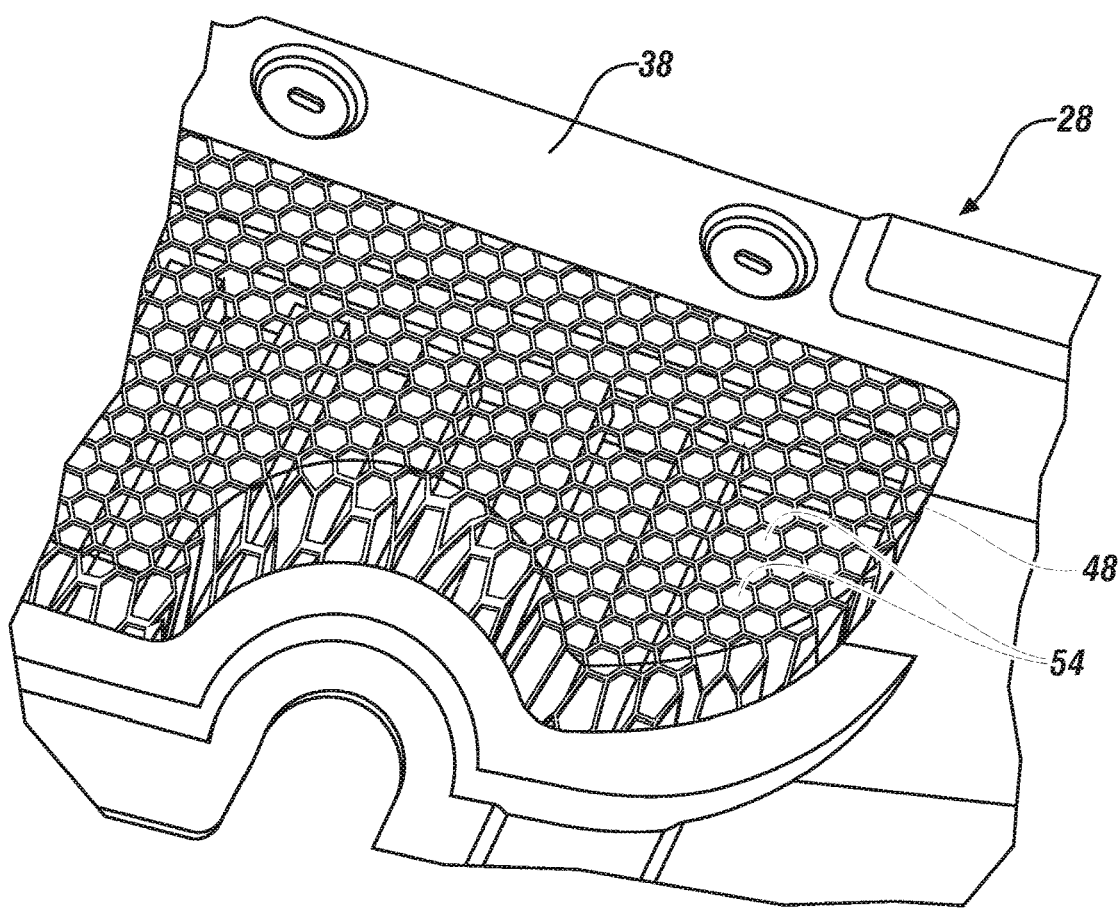
FIG. 4 is a partial perspective view of the ISP assembly with an outer layer removed to show internal detail.

Referring to FIGS. 3 and 4, the controlled plastic deformation capability of the structural inner layer 48 may be enabled by a plurality of perforations 54 that may be repeating, strategically placed along the inner layer 48, and communicating directly with the chamber 40. The resiliently flexible outer layer 50 functions to block-off, or close, the perforations 54 to assure that the air 30 flows out of the chamber 40 via the outlet 44 and not the perforations 54. Various examples of perforations 54 may include a repeating honeycomb, slots, and others. It is contemplated and understood that if the outer layer 50 is the perforated structural layer, and the inner layer 48 is the resiliently flexible layer, the perforation in the structural outer layer will not communicate with the chamber 40.

Referring to FIG. 2, and during an impact scenario, an impact load or force (see arrow 56) may be placed upon the hood 24. The impact force 56 may be at a pre-established angle 58 (e.g., about fifty degrees) as dictated by government regulatory requirements for safety. The impact force 56 may thus have a horizontal vector component 60 (i.e., x-axis) in a rearward direction, and a vertical vector component 62 (i.e., z-axis) in a downward direction. Through, for example, empirical testing, the hood 24 may exert a reactive force (not shown) in response to the impact force 56. If the magnitude of the impact force is great enough, the hood 24 will undergo plastic deformation. Upon plastic deformation of the hood 24, the hood may exert a force upon the upper first wall 36 (e.g., cap) of the ISP assembly 28.

Through, for example, empirical testing, the force exerted by the hood 24 upon the first wall 36 of the ISP assembly 28 may have known vector components and magnitudes (i.e., associated directly with the impact force 56). The upper first wall 36 is designed to exert a minimal reactive force upon the underside 46 of the hood 24 in response to the impact force 56. Therefore, the upper first wall 36 is designed with enough structural rigidity and strength to maintain the volume of the chamber 40, but not so much rigidity, in a pre-established impact direction, that the reactive force produced by the upper first wall 36 is higher than that permitted by, for example, government regulations.

The maximum reactive force capability of the upper first wall 36 (i.e., before the upper first wall 36 undergoes plastic deformation) may be established by the strategic placement of the perforations 54. That is, the size, number, and orientations of the perforations may be used to tune the reactive force capability of the upper first wall 36 in any number of directions (i.e., incident angles of impact).

Advantages and benefits of the present disclosure include an ISP assembly 28 with a softened response throughout the length and width of the ISP assembly by addressing stiffness at various points of impact. Another advantage includes a robust design with minimal impact on restricting the volume of the chamber 40 while minimizing impact reactive force capability. Yet another advantage includes the risks of expensive late engineering changes to ISP assembly designs due to conflicting criteria (i.e., government impact regulations verse maintaining chamber volume).

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope of the present disclosure.

What is claimed is:
1. An air inlet splash panel assembly for a vehicle comprising:
   a composite wall including inner and outer layers; and
   a homogeneous wall attached to the composite wall, wherein the homogeneous wall and the inner layer define a chamber for the flow of air.

2. The air inlet splash panel assembly set forth in claim 1, wherein one of the composite wall and the homogeneous wall defines at least one air inlet in fluid communication with the chamber.

3. The air inlet splash panel assembly set forth in claim 2, wherein one of the composite wall and the homogeneous wall defines an air outlet in fluid communication with the chamber.

4. The air inlet splash panel assembly set forth in claim 3, wherein the homogeneous wall defines the at least one air inlet and the air outlet.

5. The air inlet splash panel assembly set forth in claim 1, wherein the composite wall is an upper cap, and the homogeneous wall is a lower tray.

6. The air inlet splash panel assembly set forth in claim 5, wherein the tray defines a plurality of air inlets and an air outlet both in fluid communication with the chamber.

7. The air inlet splash panel assembly set forth in claim 1, wherein one of the inner and outer layers is a resiliently flexible layer and the other of the inner and outer layers is a structural layer.

8. The air inlet splash panel assembly set forth in claim 7, wherein the inner layer is the structural layer.

9. The air inlet splash panel assembly set forth in claim 7, wherein the structural layer defines a plurality of perforations.

10. The air inlet splash panel assembly set forth in claim 9, wherein each one of the plurality of perforations is in fluid communication with the chamber.

11. The air inlet splash panel assembly set forth in claim 7, wherein the structural layer is honeycombed.

12. The air inlet splash panel assembly set forth in claim 7, wherein the structural layer includes a plurality of slots for stress relief.

13. The air inlet splash panel assembly set forth in claim 7, wherein the resiliently flexible layer is elastomeric and the structural layer is plastic.

* * * * *